United States Patent [19]

Barnes et al.

[11] Patent Number: 4,675,780
[45] Date of Patent: Jun. 23, 1987

[54] CONDUCTIVE FIBER HOSE

[75] Inventors: John A. Barnes, Denver; Harrell P. Sundberg, Thornton; Joe C. Haney, Aurora, all of Colo.

[73] Assignee: The Gates Rubber Company, Denver, Colo.

[21] Appl. No.: 770,028

[22] Filed: Aug. 26, 1985

[51] Int. Cl.$^4$ ............................................. H01G 1/08
[52] U.S. Cl. .................................................. 361/215
[58] Field of Search ................. 361/215; 174/47, 84 S

[56] References Cited

U.S. PATENT DOCUMENTS

| 2,047,216 | 6/1932 | McKesson | 128/195 |
|---|---|---|---|
| 2,108,759 | 2/1938 | Turman | 221/84 |
| 2,287,766 | 6/1942 | Davis | 260/763 |
| 2,341,360 | 10/1938 | Bulgin | 154/43 |
| 3,070,132 | 4/1960 | Sheridan | 138/118 |
| 3,166,688 | 1/1965 | Rowand | 317/2 |
| 3,457,359 | 7/1969 | Souey | 174/47 |
| 3,473,087 | 10/1969 | Slade | 317/2 |
| 3,555,170 | 1/1971 | Petzatakis | 174/47 |
| 3,580,983 | 5/1971 | Jackson | 174/47 |
| 3,659,588 | 5/1972 | Kahn | 128/2 R |
| 3,828,112 | 8/1974 | Johansen et al. | 174/47 |
| 4,059,847 | 11/1977 | Phillips | 361/215 |
| 4,107,452 | 8/1978 | Razvi | 174/84 |
| 4,121,624 | 10/1978 | Chen | 138/122 |
| 4,196,464 | 4/1980 | Russell | 361/215 |
| 4,303,457 | 12/1980 | Johansen et al. | 156/149 |
| 4,319,303 | 3/1982 | Thorn | 361/215 |
| 4,394,705 | 7/1983 | Blachman | 361/215 |
| 4,405,969 | 9/1983 | Swavely | 361/215 |
| 4,487,462 | 12/1984 | Gale | 339/14 |

Primary Examiner—L. T. Mix
Assistant Examiner—Brian W. Brown
Attorney, Agent, or Firm—Frank P. Grassler; C. H. Castleman, Jr.; H. W. Oberg, Jr.

[57] ABSTRACT

A hose article for carrying volatile fluids, which can conduct and dissipate the accumulation of static electrical charges that are associated with such volatiles, which includes an elastomeric tube and outer sleeve and at least one reinforcement layer of fiber bundles sandwiched between the tube and the cover. Sandwiched between the tube and the reinforcement layer is a nontwisted yarn of fibers of carbon that runs in a direction generally lengthwise to the axis of the tube, and at the end of the tube makes electrical contact with a staple-shaped metallic connector, which in turn electrically contacts a metallic hose coupling, leading from there to an electrical ground.

46 Claims, 8 Drawing Figures

CONDUCTIVE FIBER HOSE

FIELD OF THE INVENTION

This invention relates to a hose article, and in particular, relates to a hose for the transfer of fluids which has, integrated within its structure, a flexible, nonmetallic, electrical conductor that is highly efficient in dissipating static electrical charges, and is also highly resistant to fatigue and failure when exposed to repeated bending and flexing.

BACKGROUND OF THE INVENTION

In general, the integration of a flexible, electrically conductive element within the structure of a hose for transfer of fluids, has been used as a method of dissipating static electricity charges. For example, it is well known that gasoline and other hydrocarbon liquids generate static electricity when flowing through a rubber lined hose, and that this has been the direct cause of many disastrous explosions and fires originating at filling stations. Since an automobile is supported on rubber tires, which are good electrical insulators, the static electricity that has built up in and around the hose, instead of escaping to the ground as it should when the hose contacts the automobile, merely charges the automobile chassis and body, which then serves as an enormous condenser. The capacity for storing charge in the automobile body and chassis is large, and the electrical potential thus does not rise sufficiently during the tank filling operation to cause a spark to jump from the wheel rims to the ground, as the gap there is excessively great. It happens, however, that the static charge that accumulates during the time the tank is being filled is sufficient to cause a spark when a person standing on the ground moves his fingers towards the conducting portions of the car body. If this spark takes place at or near the filling opening, it is sometimes enough to ignite the inflammable and explosive vapors that are given off from the gasoline.

As another example, hoses and tubes that carry volatile anesthetics used in surgical procedures, are likewise subject to this build-up of static electricity. Unless the static electricity is conducted along the hose or tube to grounding means, it can build up sufficient potential to cause a spark to form, igniting the highly volatile anesthetic vapors.

In general, the types of electrical charges or signals described above have been conducted along hoses or tubes through the use of plastic or rubber elastomers, which have been made semiconductive by the inclusion of particles of carbon that have been embedded in the structure of the elastomer. Another general approach has been to use metallic wires, which have been braided or spirally or helically wound around at least a portion of the hose or tube. Another approach has been to assemble a wire braid, then flatten the braid out so as to form a ribbon, and then lay the ribbon so as to follow the length of the hose or tube.

In those instances where the electrical charge or signal that was being conducted was generated by static electricity, it was also necessary to find some way of connecting the electrical conductor to an electrical grounding means. Generally, this meant that some sort of multiple pronged plate or circular ring was inserted into an end of the hose or tube so as to contact the electrically conductive portion on one end, and so as to contact with a hose coupler that was generally metallic. The hose coupler was then electrically attached to a ground.

When electrical conductors were comprised of plastic which had been made electrically conductive, the plastic would generally lose the aesthetic qualities which were sought in using the plastic in the first place. Furthermore, under some circumstances, in very high pressure hoses such as in aircraft applications, the formation of a microspark could cause a pinhole within the hose resulting in a rupture and failure of the hose. (Rowand, U.S. Pat. No. 3,166,688). On the other hand, use of electrically conductive rubber sometimes results in a heat build-up accompanying the conduction of static electricity. This heat build-up on occasion would be sufficient to ignite the hose. (Bulgin, U.S. Pat. No. 2,341,360). The use of metallic electrical conductors presented their own problems. Since they would have to be braided spirally or helically wound or zigzagged into the construction in order to impart flexibility to the finished product, these intricate methods of application would result in slow production speeds and increased production costs. A particular problem was that, due to the high flexural modulus of metallic wire, it would have a tendency to break during repeated flexing, which then would cause a loss of electrical conductivity.

There is, therefore, a need in the art for a hose and a method for producing hose, which overcomes these deficiencies. Thus, an initial object of the invention is to provide a hose product and a method of making it that uses a nonmetallic electrical conductor capable of conducting static electricity charges so as to prevent the accumulation of those charges in the area of the hose. The hose should be relatively inexpensive to manufacture, while the conductive member itself should be highly resistant to fatiguing and breaking under conditions of repeated flexing and bending. It will logically be appreciated that another object of the invention is to place a simple, inexpensive, reliable, nonmetallic, electrical conductor within the body of a hose or tube for the purpose of conducting electrical charges other than static electricity charges. A further object of the invention is to provide a simple and inexpensive means for electrically connecting the nonmetallic electrical conductor in the hose or tube to a hose coupling device. It is yet a further object of the invention to provide a hose or tube article having a photoconductive member included in the body of the tube or hose, for example, strands of fiber optics.

SUMMARY OF THE INVENTION

The present invention meets the needs of being able to dissipate static electricity charges, of being resistant to fatiguing and breaking under conditions of repeated bending and flexing, of dissipating heat build-ups, of resisting rupture and failure of the hose, and of providing a relatively inexpensive means of production and application.

In general, the invention comprises a tubular unitary article having a nonmetallic conductive member integral therewith, which in turn comprises at least an elongated tube, having length, defined by inner and outer surfaces and comprised of a polymeric material and a nonmetallic conductive member embedded within the tube, running in a direction generally lengthwise to the axis of the article, and running along at least a portion of the length of the article, and being either electroconductive or photoconductive. The invention further preferentially comprises a sleeve, comprised of a polymeric material, positioned over the outer surface of the tube, the sleeve substantially covering the outer surface of the tube.

BRIEF DESCRIPTION OF THE DRAWINGS

FIG. 1 illustrates a hose of the invention, partially in section, and partially telescoped to show its component layers;

FIG. 2 is a partial cutaway in sectional sideview of a coupled hose assembly with an electrically conductive member in electrical contact with a connecting member, which in turn is in electrical contact with a coupler;

FIG. 3 is an enlarged view taken from area 3—3 of FIG. 2 showing a static discharge member in intimate and electrical contact with a static discharge connector, which in turn is in intimate and electrical contact with an electrically conductive coupling means;

FIG. 4 is an enlarged view taken from area 4—4 of FIG. 3 to show electrical contact being made from a static discharge member to a static discharge connector;

FIG. 5 is cross section view of the hose article taken along line 5—5 of FIG. 2, showing the insertion of a discharge connector into the end of the hose so as to intimately and electrically contact the conductive member;

FIG. 6 is a sideview of the static discharge connector;

FIG. 7 is a schematic diagram, showing how individual fibers of the static discharge member are capable of reciprocally sliding past one another.

DESCRIPTION OF THE PREFERRED EMBODIMENT

Figure 1:
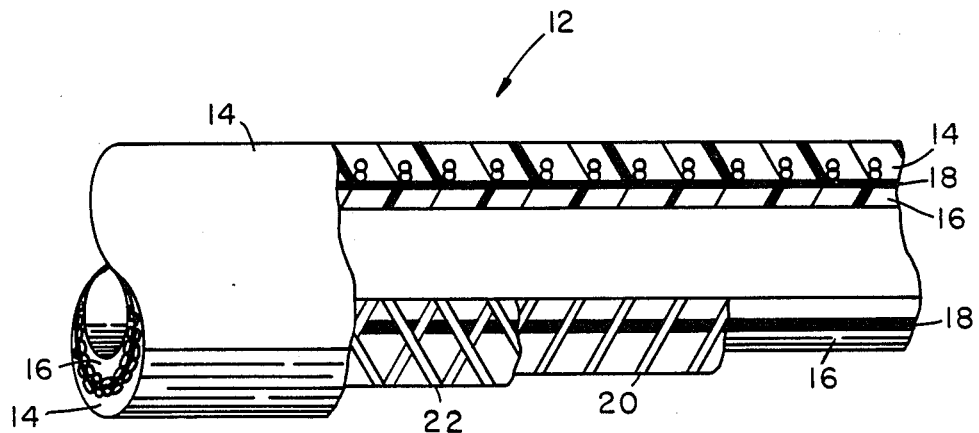
FIGS. 1-7 illustrate the most preferred embodiment of the present invention, using numerals 12 through 37 to show features.
Figure 7:
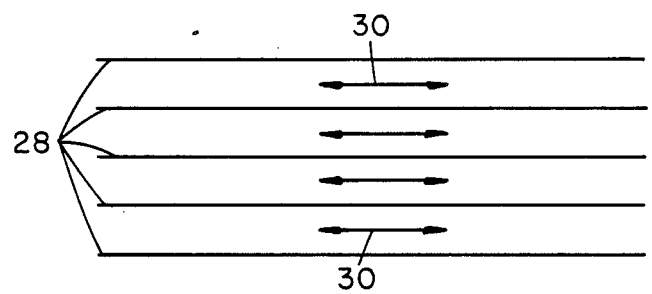

Referring first to FIG. 1, there is shown generally at 12, a preferred embodiment of the conductive fiber hose. In the preferred embodiment, hydrocarbonaceous or other volatile fluids are conveyed along within a cylindrical tube 16, which is composed of a polymeric material and preferably of an elastomer. Layed onto the outside surface of the tube 16, in a direction running longitudinal and parallel to the tube, there is, in the most preferred embodiment, a static discharge member 18, which is a yarn of carbon fibers. Alternatively, the yarn may be spirally or helically wound around the exterior of the tube 16 so as to run generally lengthwise to the axis of the hose. In the preferred yarn, fibers are continuous filaments fibers and the yarn is a zero twist yarn. The number of fibers in a given length of yarn can typically number between about 6,000 and about 12,000, although higher and lower values also can be used. The fibers are manufactured from polyacrylonitrile precursor and their surface is then treated by sizing with a conductive epoxy to improve the handling characteristics of the fibers. After having been sized with an epoxy, the fibers are able to reciprocally slide past one another. In FIG. 7, there is shown schematically individual carbon fibers 28, which are capable of reciprocally sliding past one another in relative lengthwise directions of movement 30. The typical electrical resistivity of a yarn composed of these carbon fibers is about 1,500 microhm-cm, although higher and lower resistivities can also be used. The yarn will have a typical tensile strength running in a range from $450 \times 10^3$ p.s.i. to $515 \times 10^3$ p.s.i. Typical tensile modulus of such a yarn will run $33 \times 10^6$ p.s.i. to $34 \times 10^6$ p.s.i. Ultimate elongation typically runs approximately 1.2% to 1.5%. Tensile strength, tensile modulus, and ultimate elongation values are all arrived at using an impregnated strand test method. Commercially, a carbon fiber static discharge member yarn having the above mentioned preferred qualities and characteristics can be prepared, using a material that is available as Celion ®, a product of Celanese Corporation.

Having described the preferred carbon fiber static discharge member 18, and returning to FIG. 1, there is shown a helically wound fiber bundle reinforcement member 20, which is twined over the static discharge member 18, and over the periphery of the tube 16, preferably at a locking angle of about 54°. There is then twined a second fiber reinforcement member 22 over the first fiber reinforcement member 20 in an opposite handed helical direction. There is then applied over the second fiber reinforcement member 22 a sleeve 14 comprised of a polymeric material, and preferably of an elastomer. If elastomers are used in the tube 16 and the sleeve 14, they can be used in their uncured state, and subsequently cured to form a unitary hose article integrally attached together and free from mutual slippage.

Figure 2:
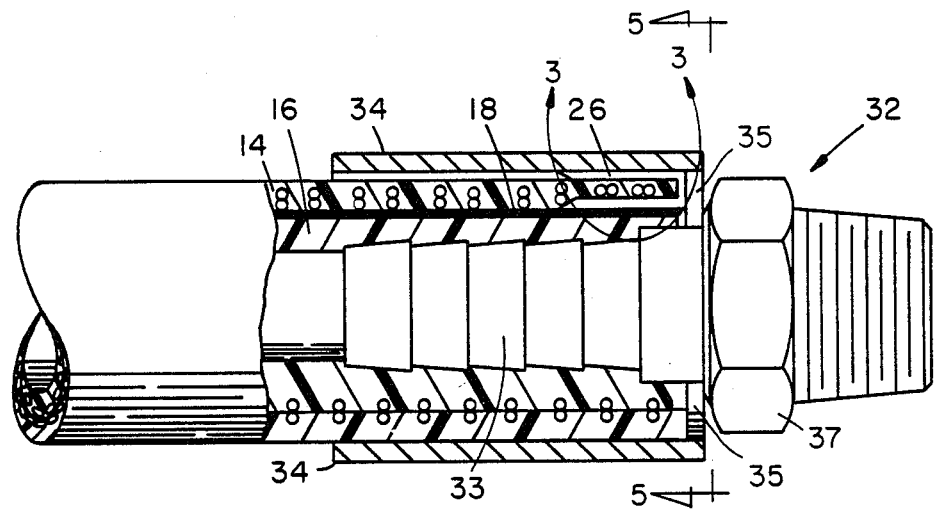
Figure 3:
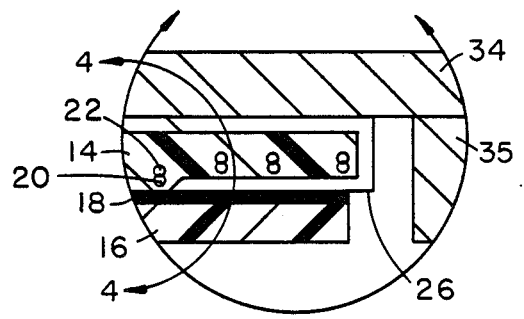
Figure 6:
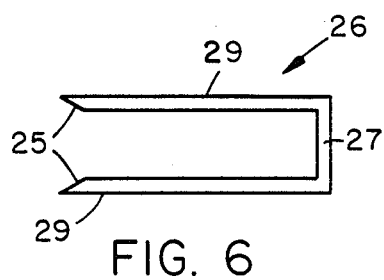

Turning now to FIG. 2, there is shown generally a coupling means 32, which has been installed onto an end of the hose 12. The coupling means 32 should preferably be a metal having good electrical conductivity. The coupling means ferrule 34 is shown capping the endmost portion of the hose 12. The ferrule 34 is attached to the coupling means flange 35, which in turn contacts the coupling means nut and threads 37. A ferrule stem 33 is also shown, contacting the inner surface of the tube 16. Turning briefly to FIG. 6, there is shown the static discharge connector 26. The static discharge connector 26 is a length of metallic wire having good electrical conductivity, which has been formed into a general U-shape when viewed from its side, and which has been given two knife-like or chisel-like sharpened ends 25. When the static discharge member has been formed into a U-shape, it forms two legs 29 and a shoulder 27. In the preferred embodiment, the width of the shoulder 27 is equal to the thickness of the outer elastomeric sleeve 14. Turning now to FIG. 3, which is an enlarged view taken from area 3—3 of FIG. 2, there is shown the static discharge connector 26, which has been inserted into an end of the hose article such that one of its legs 29 is in contact with the carbon fiber static discharge member 18 and such that the other leg 29 is on the outer surface of the elastomeric outer sleeve 14, and is in electrical contact with the ferrule 34 of the coupling means 32. In this manner, an electrical circuit is established connecting the carbon fiber static discharge member 18, the static discharge connector 26 and the coupling means 32, via ferrule 34.

Figure 4:
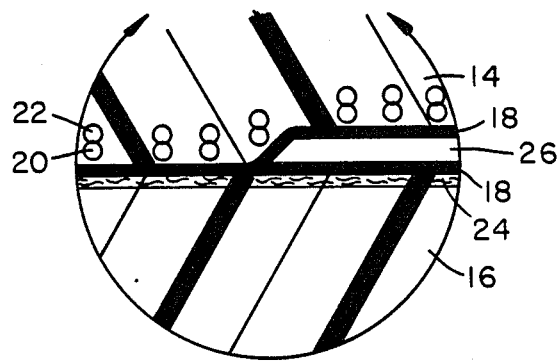

In FIG. 4, which is an enlarged area view of area 4—4 of FIG. 3, there is shown in greater detail a schematic representation of the preferred manner contact is made between the static discharge connector 26 and the carbon fiber static discharge member 18, whereby the chisel-like end 25 of the static discharge connector 26 has separated individual strands of the yarn of the carbon fiber static discharge member 18. Also shown in FIG. 4 is a static discharge underlay member 24, which is a textile yarn, which has been layed down so as to be sandwiched in between the carbon fiber static discharge member 18 and the elastomeric tube 16, and aids in preventing binding of the static discharge member 18 to the tube 16 during flexing and bending.

Figure 5:
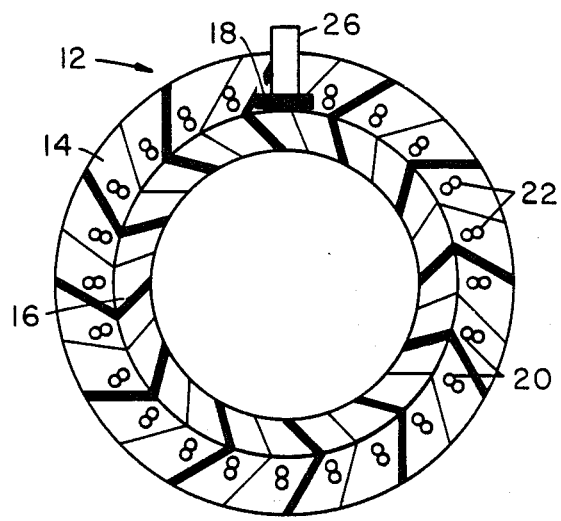

In FIG. 5 there is shown an end section of the hose article 12, where it can be seen that the static discharge connector 26 has been inserted into the end of the hose article 12 in a manner so as to contact the carbon fiber static discharge member 18, and so as to have the second leg 29 of the static discharge connector on the outside surface of the elastomeric outer sleeve 14, preparatory to installing the end coupling 32.

Figure 8:
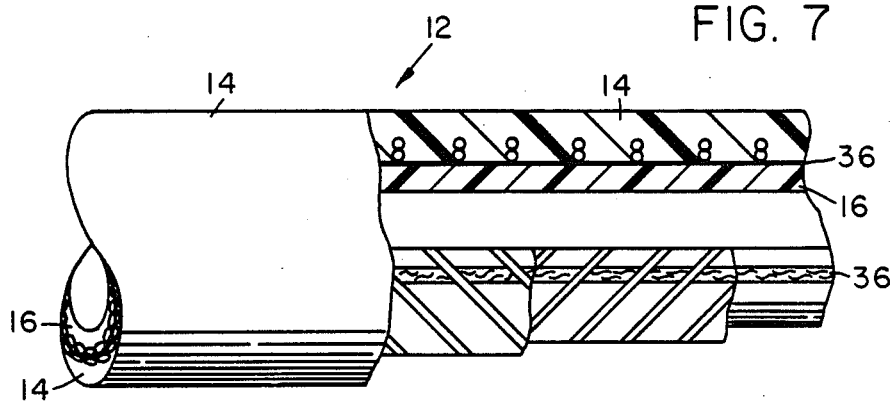
FIG. 8 is an illustration of an alternative embodiment of the hose, partially in section and partially telescoped to show component layers.

FIG. 8 shows an alternate embodiment of the invention. In this alternate embodiment, the conductive fiber is photoconductive rather than electroconductive, and the photoconductive member is shown at 36, as will be described in further detail hereunder.

In the preferred method of constructing the conductive fiber hose, there is first formed a core tube 16, which may be extruded by a process well known to those skilled in the art, and which is comprised of a polymeric material, and preferably, an elastomer in an uncured state. There is preferably then layed a nonmetallic static discharge member 18 radially outwardly of the outer surface of the tube 16, being layed in a direction lengthwise, most preferably substantially parallel to, the tube 16, running along at least a portion of the length of the tube 16, and being materially comprised of a yarn of carbon fibers. There is then twined at least one reinforcement layer comprised of fiber bundles 20 over the tube 16 and over the discharge member 18. There is then formed an outer sleeve 14 of a polymeric material, and preferably, an elastomeric material, separate of the tube, in an uncured state, and of substantially the length of the tube. The outer sleeve 14 is then positioned upon the outer surface of the tube 16 at a predetermined desired location, the sleeve 14 substantially covering the outer surface of the tube 16, and substantially covering the discharge member 18. The uncured elastomeric tube 16 and the uncured elastomeric outer sleeve 14 are then cured together to form the tubular unitary hose, whereby the tube 16, the reinforcement member 20, the carbon fiber static discharge member 18, and the elastomeric outer sleeve 14 are integrally attached together and free from mutual slippage.

Although after curing the article there is no mutual slippage between the elastomeric tube 16 and the elastomeric outer sleeve 14, it should be noted that the individual filaments of the carbon fiber static discharge member yarn 28 are still relatively free to slide longitudinally past one another, thereby helping to prevent the static discharge member 18 from breaking under conditions of repeated bending and flexing.

After having manufactured the fluid-containing hose described above, in its preferred embodiment the static discharge connector 26 is inserted into an end of the hose 12, in between the tube 16 and the outer sleeve 14, so as to come into electrical contact with the static discharge member 18. The static discharge connector 26 is formed into a two-legged U-shape, as viewed from the connecting member's side; the first leg of the U-shape 29 being inserted in between the tube and sleeve, making electrical contact with the discharge member 18, and the second leg 29 of the U-shape, being on the outside of the outer sleeve 14, electrically contacting a coupling means 32 attached by means well known in the art onto an end of the hose 12, and which is comprised of an electrically conductive material. In an alternative method of manufacture, a tubular unitary article can be constructed of a tube alone comprised of a polymeric material, and preferably an elastomer, and embedded within the elastomeric tube, an electroconductive or photoconductive nonmetallic member running in a direction generally lengthwise to the tube along at least a portion of the length of the tube. The electroconductive or photoconductive member may be a fiber, yarn, or bundle of a suitable nonmetallic conductive material.

Although the preferred embodiment of the conductive fiber hose is an article that is generally useful for carrying hydrocarbonaceous or other volatile fluids and dissipating the static electrical charge build-up associated with the transfer of such fluids, it will be appreciated by those skilled in the art that other embodiments are contemplated by this invention as well. For example, constructing a hose according to this invention having a nonmetallic electroconductive member embedded somewhere in it, means that the source of an electronic charge conducted along such a member need not necessarily be an accumulated charge of static electricity, but could as well be other source-generated electronic energy, such as is generated by a sensing device or by another source generating device. The electronic energy could be in the form of a signal or charge or current, and would be conducted along the nonmetallic electroconductive member embedded somewhere in the hose article, the member running generally longitudinally to the axis of the hose article. At the end of the hose article, the signal, charge, or current would be contacted by a conductive connector means, which would transmit the energy to a conductive coupling means, which in turn would be in electrical contact with an equipment means for receiving the electronic energy. Such equipment means would be a sensor or sensing device or a mechanical device that would operate in response to the reception of such electronic energy. Alternatively, source-generated photonic energy could be conducted within the construction of this hose article by somewhere embedding within the hose article a nonmetallic photoconductive member, for example a fiber optic bundle. Photonic energy could thus be transmitted by the photoconductive member embedded in the hose article in a direction generally longitudinal to the axis of the hose article. At an end of the hose article the photonic energy could then be contacted with an equipment means for receiving the photonic energy, such as a sensor or sensing device or mechanical device that would respond to the reception of such energy.

While certain representative embodiments and details have been shown for the purpose of illustrating the invention, it will be apparent to those skilled in this art that various changes and modifications may be made therein without departing from the spirit or scope of the invention.

What is claimed is:

1. A tubular unitary article having a nonmetallic conductive member integral therewith, comprising:
   an elongated tube, having length, defined by respective inner and outer surfaces and comprised of a polymeric material;
   a sleeve, comprised of a polymeric material, positioned over the outer surface of the tube, the sleeve substantially covering the outer surface of the tube; and
   a nonmetallic conductive fiber bundle member, embedded within the article, running in a direction generally lengthwise to the axis of the tube, and running along at least a portion of the length of the tube, and substantially covered by the sleeve.

2. The article as claimed in claim 1, wherein the tube is an elastomer.

3. The article as claimed in claim 2, wherein the elastomer is in an uncured state.

4. The article as claimed in claim 1, wherein the sleeve is an elastomer.

5. The article as claimed in claim 4, wherein the elastomer is in an uncured state.

6. The article as claimed in claim 1, wherein the tube and the sleeve are elastomers in an uncured state, and which uncured elastomers are cured together to form an article whereby the tube, the conductive member, and the sleeve are integrally attached together and free from mutual slippage.

7. The article as claimed in claim 1, wherein the nonmetallic conductive member runs in a direction substantially parallel to the axis of the tube.

8. The article as claimed in claim 1, wherein the nonmetallic conductive member is spirally wound over the outer surface of the tube.

9. The article as claimed in claim 1, wherein the nonmetallic conductive member is helically wound over the outer surface of the tube.

10. The article as claimed in claim 1, wherein the nonmetallic conductive member is a conductor of electrons.

11. The article as claimed in claim 1, wherein the nonmetallic conductive member is a conductor of photons.

12. The article as claimed in claim 1, wherein the conductive member is a yarn comprised of a bundle of fibers of carbon.

13. The article as claimed in claim 12, wherein the yarn of carbon fibers contains approximately 6,000 to 12,000 filaments.

14. The article as claimed in claim 12, wherein the yarn of carbon fibers contains 6,000 or less filaments.

15. The article as claimed in claim 12, wherein the yarn of carbon fibers contains 12,000 or more filaments.

16. The article as claimed in claim 1, wherein the conductive member has a volume resistivity of approximately 1,500 microhm-cm.

17. The article as claimed in claim 1, wherein the conductive member has a volume resistivity less than 1,500 microhm-cm.

18. The article as claimed in claim 1, wherein the conductive member has a volume resistivity greater than 1,500 microhm-cm.

19. The article as claimed in claim 12, wherein the fibers comprising the yarn exhibit a tensile strength of approximately $4.50 \times 10^4$ p.s.i. to $5.15 \times 10^4$ p.s.i. using an impregnated strand test method.

20. The article as claimed in claim 12, wherein the fibers comprising the yarn exhibit a tensile modulus of approximately $3.3 \times 10^7$ p s.i. to $3.4 \times 10^7$ p.s.i. using an impregnated strand test method.

21. The article as claimed in claim 12, wherein the ultimate elongation of the fibers is approximately 1.2% to 1.5%, using an impregnated strand test method.

22. A tubular unitary article having a nonmetallic conductive member integral therewith, comprising:
an elongated tube, having length, defined by inner and outer surfaces and comprised of an elastomer; and
a nonmetallic conductive member embedded within the tube, running in a direction generally lengthwise to the axis of the article, and running along at least a portion of the length of the article, and is electroconductive or photoconductive.

23. A tubular unitary article having a nonmetallic conductive member integral therewith, comprising:
an elongated tube having length, defined by respective inner and outer surfaces and comprised of an elastomer;
a carbon fiber electrically conductive member, layed over the outer surface of the tube, running in a direction generally lengthwise and substantially parallel to the axis of the tube, running along at least a portion of the length of the tube;
a reinforcement member, comprised of fiber bundles, and twined over the tube and the conductive member, running along at least a portion of the length of the tube and the length of the conductive member; and
a sleeve, comprised of an elastomer, positioned over the reinforcement member, substantially covering the tube, the conductive member, and the reinforcement member.

24. The article as claimed in claim 23, wherein the reinforcement member is spirally wound over the tube and the conductive member.

25. The article as claimed in claim 23, wherein the reinforcement member is braided over the tube and the conductive member.

26. The article as claimed in claim 23, wherein the conductive member is a zero-twist yarn.

27. An article as claimed in claim 23, further comprising a secondary yarn layed in a direction running generally lengthwise and substantially parallel to the axis of the tube, and positioned in between the outer surface of the tube and the conductive member.

28. The article as claimed in claim 26, wherein the fibers of the zero-twist yarn are comprised of carbon fibers sized with an epoxy resin giving the surface of the fibers a reduced friction surface sufficient to permit mutual slippage of the fibers past one another along lines generally parallel to the length of the fibers.

29. A tubular unitary article having respective inner and outer surfaces, and having a nonmetallic conductive member integral therewith comprising:
an elongated tube having length, defined by respective inner and outer surfaces and comprised of an elastomer;
a carbon fiber electroconductive member, layed over the outer surface of the tube, running in a direction generally lengthwise and substantially parallel to the axis of the tube, running along at least a portion of the length of the tube;
a reinforcement member, comprised of textile fiber bundles, spirally twined over the tube and the conductive member, running along at least a portion of the length of the tube and the length of the conductive member;
an elastomeric sleeve positioned over the reinforcement member, substantially covering the tube, the conductive member, and the reinforcement member;
a coupling means attached to the end of the article, comprising an electroconductive material; and
a connector means electrically joining the carbon fiber conductive member to the coupling means.

30. The article as claimed in claim 29, in which the connector means is positioned onto an end of the article, and contacts the carbon fiber conductive member, and is sandwiched in between at least a portion of the tube and at least a portion of the sleeve, and projects outward from the end of the article for a predetermined desired length, the outwardly projecting portion contacting the coupling means.

31. The article as claimed in claim 30, in which the connector means is a two-legged U-shape when viewed from the side.

32. The article as claimed in claim 30, in which one leg of the U-shape connecting means is inserted in between the tube and the sleeve, and electrically contacts the conductive member, and the other leg of the U-shape connecting means fits in between the coupling means and the outside surface of the article, and electrically contacts the coupling means.

33. The article as claimed in claim 31, in which one leg of the U-shape connecting means is fitted in between the tube and the sleeve, and electrically contacts the conductive member, and the other leg of the U-shape connecting member fits in between the coupling means and the inside surface of the article, and electrically contacts the coupling means.

34. A method for forming a tubular unitary article having a nonmetallic conductive member integral therewith, comprising the steps of:
forming an elongated tube having length, defined by respective inner and outer surfaces, and comprised of a polymeric material;
laying a nonmetallic electroconductive or photoconductive member radially outward of the outer surface of the tube, being layed in a direction generally lengthwise to the tube, and running along at least a portion of the length of the tube;
forming a polymeric material sleeve, separate of the tube, of substantially the length of the tube; and
positioning the sleeve radially outward of the outer surface of the tube at a predetermined desired location, the sleeve substantially covering the outer surface of the tube and substantially covering the conductive member.

35. The method as claimed in claim 34, wherein the tube is an elastomer in an uncured state.

36. The method as claimed in claim 34, wherein the sleeve is an elastomer in an uncured state.

37. The method as claimed in claim 34, further comprising the step of curing the tube and the sleeve together to form the tubular unitary article whereby the tube, the conductive member and the sleeve are integrally attached together and free from mutual slippage.

38. A method for forming a fluid containing hose having a nonmetallic static discharge member integral therewith comprising the steps of:
forming an elongated tube having length and thickness, and being defined by respective inner and outer surfaces separated by the measure of the thickness, and being materially comprised of an elastomer in an uncured state;
laying a nonmetallic static discharge member radially outwardly of the outer surface of the tube, being layed in a direction lengthwise and substantially parallel to the tube, running along at least a portion of the length of the tube, and being materially comprised of a yarn of carbon fibers;
twining at least one reinforcement layer comprised of fiber bundles over the tube and over the discharge member;
forming an elastomeric sleeve, separate of the tube, in an uncured state, of substantially the length of the tube;
positioning the sleeve upon the outer surface of the tube at a predetermined desired location, the sleeve substantially covering the outer surface of the tube, and substantially covering the discharge member; and
curing the tube and the sleeve together to form the tubular unitary article whereby the tube, reinforcement layer, dicharge member, and sleeve are integrally attached together and free from mutual slippage.

39. The method of claim 38, further comprising inserting an electrically conductive connecting member into an end of the hose, in between the tube and the sleeve, and in electrical contact with the discharge member.

40. The method of claim 39, in which the connecting member has been formed into a two-legged U-shape, as viewed from the connecting member's side, and the first leg of the U-shape is inserted in between the tube and the sleeve, and is in electrical contact with the discharge member.

41. The method of claim 40, further comprising the step of attaching a coupling means onto an end of the hose, which is comprised of an electrically conductive material, and which is in electrical contact with the second leg of the U-shaped connecting member.

42. A method for forming a tubular unitary article having a nonmetallic conductive member integral therewith, comprising the steps of:
forming a tube having length, defined by respective inner and outer surfaces, and comprised of an elastomer; and
embedding an electroconductive or photoconductive member within the tube, running in a direction generally lengthwise and substantially parallel to the tube, along at least a portion of the length of the tube.

43. A method of transmitting source-generated electronic or photonic energy within the construction of a hose article comprising the steps of:
constructing a hose article having at least a tube with a nonmetallic electroconductive or photoconductive member embedded in the hose article, the conductive member running generally longitudinally to the axis of the hose article;
positioning a conductive connector means onto an end of the hose article so as to contact the conductive member;
attaching a coupling means to an end of the hose so as to contact the conductive connector means; and
contacting the coupling means with an equipment means for receiving the electronic or photonic energy.

44. The method as claimed in claim 43, wherein the nonmetallic electroconductive or photoconductive member is embedded within the tube.

45. The method as claimed in claim 43, in which the generating source is static electricity created by naturally occuring chemical and physical processes within the hose article.

46. The method as claimed in claim 43, in which the generating source is an equipment means for generating electronic or photonic signals.

* * * * *